Jan. 7, 1947.    L. REICHOLD    2,413,890
SEAL BREAKER FOR COFFEE MAKERS
Filed March 24, 1944

INVENTOR.
LUDWIG REICHOLD.
BY
Louis V. Lucia
ATTORNEY.

Patented Jan. 7, 1947

2,413,890

UNITED STATES PATENT OFFICE 2,413,890

SEAL BREAKER FOR COFFEE MAKERS

Ludwig Reichold, Winsted, Conn., assignor to The Silex Company, Hartford, Conn., a corporation of Connecticut Application March 24, 1944, Serial No. 528,008

4 Claims. (Cl. 99—292)

This invention relates to a seal breaker for coffee makers and more particularly to a device for lifting the upper bowl of a vacuum type coffee maker so as to break a seal between said upper bowl and the lower bowl to thereby facilitate the removal of said upper bowl from the lower bowl.

It is well known that in coffee makers, particularly those of the vacuum type wherein a sealing member is commonly used for permitting a vacuum in the lower bowl, it is often very difficult to detach the upper bowl after a coffee brewing operation due to the fact that the vacuum in the lower bowl has caused the sealing member to be drawn tightly into the mouth of the lower bowl. This is particularly true since the said upper bowl is not, after the brewing operation, and cannot be firmly grasped with the hand to break the seal between the upper and lower bowls so as to permit removal of the upper bowl.

An object of this invention, therefore, is to provide a simple and inexpensive means for applying a lifting force upon the upper bowl to cause breaking of the seal between it and the lower bowl.

A further object of this invention is to provide a lever, in combination with the coffee maker handle, which will afford a leverage for raising the upper bowl sufficiently to break the seal between it and the lower bowl.

Further objects and advantages of this invention will be more clearly understood from the following description and from the accompanying drawing in which.

Figure 1:
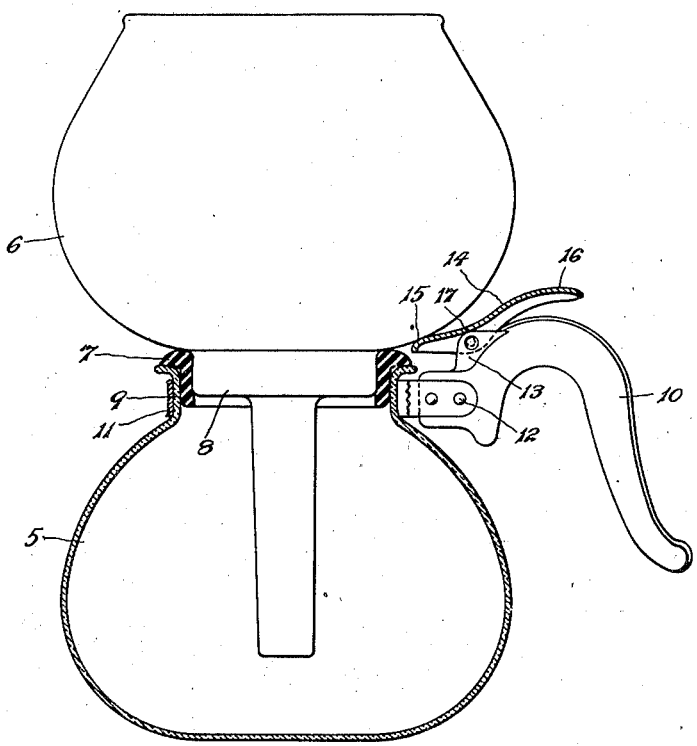
Fig. 1 is a side view, partly in central section, of a coffee maker embodying my invention.

As shown in the drawing, the numeral 5 denotes the lower bowl of a coffee maker, 6 the upper bowl and 7 a resilient collar or sealing member fitting between a depending portion 8 of the upper bowl and the neck 9 of the lower bowl.

A handle 10 is secured to the lower bowl by means of a band 11 which extends around the neck 9 and is attached to the handle with fastening members 12.

In the embodiment of my invention as illustrated, the handle 10 is provided with a projection 13 extending from the upper portion of the handle and to which is pivotally mounted a lever 14 having a forward portion 15 extending under the upper bowl 6 and a rear portion 16 extending over the top of the handle 10.

Figure 3:
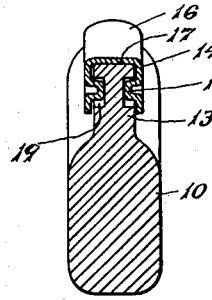
Fig. 3 is an enlarged end view in central vertical section on line 3—3 of Fig. 2.

As illustrated in Fig. 3, the said lever is preferably constructed of an inverted U-shaped member having the upper portion thereof resting upon the top of the projection 13, as at 17, and adapted to pivot thereon so that the said projection will support the lever during its seal breaking operation.

This is accomplished by providing inwardly extruded bosses 18 which are pre-formed in the lever 14 and fit loosely within the recesses 19, at opposite sides of the projection 13 to permit engagement with the top of the boss 13 as indicated at 17. The said bosses 18 serve merely to retain the lever 14 in operating position upon the projection 13 but no load is applied upon said bosses in the operation of the lever. This eliminates the use of a pivot pin or boss which must necessarily be strong enough to support the load applied upon the pivotal point and further serves to reduce the cost of assembling said lever to the handle.

Figure 2:
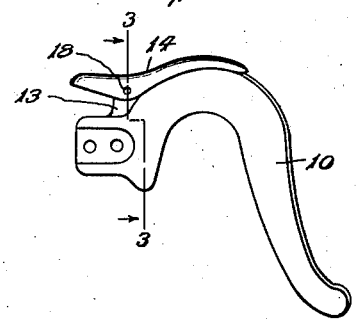
Fig. 2 is a side elevational view of the handle with the seal breaking lever in its normal position upon the upper surface thereof.

When the upper bowl 6 has been removed from the lower bowl, the lever 14 normally rests upon the top of the handle as illustrated in Fig. 2. When the upper bowl is placed upon the lower bowl, the bottom of said upper bowl will engage the end of the lever and move it into the position illustrated in Fig. 1.

During the coffee brewing operation, a considerable vacuum is created in the lower bowl. This tends to draw the upper bowl downwardly into the lower bowl and cause a tight seal to be formed between the upper bowl and the neck of the lower bowl, which seal must be broken before the upper bowl can be removed so that the coffee can be poured from the lower bowl. As the upper bowl is usually hot after a brewing operation, it cannot be easily handled and this renders it very inconvenient and difficult to break the seal so that the upper bowl may be lifted.

With my invention, the said seal may be easily broken by simply forcing downwardly with the thumb on the end 16 of the lever 14 while holding the coffee maker by the handle 10. This applies a leverage to the end 15 of the lever which will readily lift the upper bowl sufficiently to break the seal and thereby permit it to be easily removed from the lower bowl.

I claim:

1. A coffee maker of the character described comprising a lower bowl, an upper bowl mounted on said lower bowl, a seal between said upper and lower bowls, a handle carried by the lower bowl, a substantially horizontally positioned lever pivotally mounted directly to said handle and overlying the same with the inner end of said lever underlying and contacting the lower overlying portion of the upper bowl, and the outer end of the lever terminating inwardly of the outer side of the upper portion of said handle, said lever being of substantially inverted U-shape in cross-section and the pivotal connection between the handle and lever including inwardly directed bosses on side portions of the lever and receiving depressions at opposite sides of the handle for said bosses.

2. A coffee maker of the character described comprising a lower bowl, an upper bowl mounted on said lower bowl, a seal between said upper and lower bowls, a handle carried by the lower bowl, a substantially horizontally positioned lever pivotally mounted directly to said handle and overlying the same with the inner end of said lever underlying and contacting the lower overlying portion of the upper bowl, and the outer end of the lever terminating inwardly of the outer side of the upper portion of said handle, said lever being of substantially inverted U-shape in cross-section and the pivotal connection between the handle and lever including a rib of reduced cross-section rising from said handle with depressions in opposite sides thereof and inwardly directed bosses on side portions of the lever pivotally supported in said depressions.

3. A coffee maker of the character described comprising a lower bowl, an upper bowl mounted on said lower bowl, a seal between said upper and lower bowls, a handle carried by the lower bowl, a substantially horizontally positioned lever pivotally mounted directly to said handle and overlying the same with the inner end of said lever underlying and contacting the lower overlying portion of the upper bowl, and the outer end of the lever terminating inwardly of the outer side of the upper portion of said handle, said lever being of substantially inverted U-shape in cross-section and the pivotal connection between the handle and lever including inwardly directed bosses on side portions of the lever and receiving depressions at opposite sides of the handle for said bosses, said lever being so proportioned as to be overbalanced at its outer end whereby the inner end thereof comes into contact with the upper bowl when the latter is lowered into position on the lower bowl.

4. A coffee maker of the character described comprising a lower bowl, an upper bowl mounted on said lower bowl, a seal between said upper and lower bowls, a handle carried by the lower bowl, a substantially horizontally positioned lever pivotally mounted directly to said handle and overlying the same with the inner end of said lever underlying and contacting the lower overlying portion of the upper bowl, and the outer end of the lever terminating inwardly of the outer side of the upper portion of said handle, said lever being of substantially inverted U-shape in cross-section and the pivotal connection between the handle and lever including a rib of reduced cross-section rising from said handle with depressions in opposite sides thereof and inwardly directed bosses on side portions of the lever pivotally supported in said depressions, said lever being so proportioned as to be overbalanced at its outer end whereby the inner end thereof comes into contact with the upper bowl when the latter is lowered into position on the lower bowl.

LUDWIG REICHOLD.